(12) United States Patent
Messina et al.

(10) Patent No.: US 10,833,493 B2
(45) Date of Patent: Nov. 10, 2020

(54) DEVICE AND METHOD FOR REMOVING A SHEATH OF ELECTRICAL CONDUCTORS

(71) Applicant: SCHLEUNIGER HOLDING AG, Thun (CH)

(72) Inventors: Carmelo Messina, Baar (CH); Jörg Furrer, Horw (CH); Klemens Imholz, Zug (CH); Roman Widmer, Birmensdorf (CH)

(73) Assignee: SCHLEUNIGER AG, Thun (CH)

( * ) Notice: Subject to any disclaimer, the term of this patent is extended or adjusted under 35 U.S.C. 154(b) by 0 days.

(21) Appl. No.: 16/290,070

(22) Filed: Mar. 1, 2019

(65) Prior Publication Data

US 2019/0199074 A1 Jun. 27, 2019

Related U.S. Application Data

(62) Division of application No. 15/810,657, filed on Nov. 13, 2017, now Pat. No. 10,381,809.

(30) Foreign Application Priority Data

Nov. 15, 2016 (EP) ..................................... 16199001

(51) Int. Cl.
*H02G 1/12* (2006.01)

(52) U.S. Cl.
CPC ......... *H02G 1/1265* (2013.01); *H02G 1/1297* (2013.01); *H02G 1/1285* (2013.01); *H02G 1/1292* (2013.01)

(58) Field of Classification Search
CPC .. H02G 1/1265; H02G 1/1297; H02G 1/1285; H02G 1/1292
See application file for complete search history.

(56) References Cited

U.S. PATENT DOCUMENTS

| | | | |
|---|---|---|---|
| 3,125,915 A | * | 3/1964 | Ahearn ................ H02G 1/1265 82/86 |
| 3,128,658 A | | 4/1964 | Mitchell et al. |
| 5,361,489 A | * | 11/1994 | Vatel ...................... H02G 1/127 29/825 |
| 5,361,653 A | | 11/1994 | Pradin |

(Continued)

FOREIGN PATENT DOCUMENTS

| CH | 710 236 A2 | 4/2016 |
|---|---|---|
| CN | 102 130 410 A | 7/2011 |

(Continued)

OTHER PUBLICATIONS

European Search Report Corresponding to 16199002.3 dated Apr. 21, 2017.

(Continued)

*Primary Examiner* — Omar Flores Sanchez
(74) *Attorney, Agent, or Firm* — Davis & Bujold PLLC; Michael J. Bujold

(57) ABSTRACT

A method of removing an inner sheath of electrical conductors of a multicore cable (K) having a film located between a shielding or an insulation and the inner conductors. The method comprising the steps of clamping of the cable (K), cutting of the inner sheath, establishing a connection with a pull-off means (5), and subsequently pulling off a cut or a cut-off sheath in a longitudinal direction of the cable (K).

5 Claims, 4 Drawing Sheets

(56) References Cited

U.S. PATENT DOCUMENTS

| | | | | |
|---|---|---|---|---|
| 6,094,821 | A  * | 8/2000 | College | H02G 1/127 |
| | | | | 30/90.1 |
| 9,391,434 | B2 * | 7/2016 | Allen | B26D 3/001 |
| 2013/0125720 | A1 | 5/2013 | Allen | |
| 2016/0308337 | A1 | 10/2016 | Allen | |
| 2016/0322792 | A1 | 11/2016 | Dober et al. | |
| 2018/0109085 | A1 | 4/2018 | Kiser et al. | |
| 2018/0166867 | A1 | 6/2018 | Troy et al. | |

FOREIGN PATENT DOCUMENTS

| | | |
|---|---|---|
| DE | 1 490 940 | 9/1971 |
| DE | 43 36 539 A1 | 4/1995 |
| EP | 2 871 734 A1 | 5/2015 |
| EP | 3 089 294 A1 | 11/2016 |
| JP | S50-077887 U | 7/1975 |
| KR | 101 610 306 B1 | 4/2016 |
| WO | 97/17626 A1 | 5/1997 |
| WO | 2008/152551 A1 | 12/2008 |
| WO | 2010/061303 A2 | 6/2010 |

OTHER PUBLICATIONS

European Search Report Corresponding to 16199001.5 dated Aug. 29, 2017.
European Office Action issued in corresponding European Patent Application No. 16 199 001.5 dated Feb. 4, 2020.

* cited by examiner

DEVICE AND METHOD FOR REMOVING A SHEATH OF ELECTRICAL CONDUCTORS

The invention relates to a device for removing a sheath of electrical conductors of a preferably multicore cable, preferably of a film located between a shielding or an insulation and the inner conductors, comprising at least one holding arrangement/clamping device for clamping the cable, and a blade arrangement, which can preferably be rotated about the longitudinal cable axis, for the sheath, as well as to a method for removing an inner sheath of electrical conductors of a multicore cable, preferably of a film located between a shielding or an insulation and the inner conductors, comprising the clamping of the cable and the cutting of the inner sheath.

The strands of cables, in particular in the case of cables comprising a plurality of strands, are sometimes wrapped with a film. The latter needs to be removed in order to machine the strands, which can be very difficult, to which the wrapping angle, the thickness of the film, the film material, the overlap, etc., contribute. Viewed in the cross section, the shape of the film does not present itself as being round, because it at least partially clings to the strands located therebelow and, viewed in the cross section, assumes a contour for instance in a cloverleaf shape in such a way in the case of an example comprising four strands. It goes without saying that cables comprising more or fewer strands are possible as well.

Common solutions provide for example a "blow-brush mechanism", as it is disclosed for example in EP 2871734 A1. An accommodation in the form of a bushing is thereby provided for the end of the cable to be machined, as well as an operating head, which can be moved axially with respect to the axis of the central opening relative to the accommodation and which has at least one central compressed air nozzle, which is oriented towards the end of the cable. The film sheath of the inner conductors can thereby be opened quickly in a very gentle manner, in that it is made to burst open or at least to inflate by means of the burst of compressed air or compressed air stream. The lifted film can then be permanently removed by means of a rotating cutting or milling head, in the rotating axis of which the compressed air nozzle and the compressed air supply line, which leads to this compressed air nozzle, are preferably fashioned. The machining head can also be provided with an axially oriented annular cutting edge, the circumference of which corresponds to that of the inner conductors.

CH 710236 A2 discloses a cladding-cutting device comprising a rotating blade for an outer insulator of a cable. A cut is made therewith in a cladding of an electrical line comprising an insulation sheath, for the purpose of which a disc cutter, a lifting unit, which lifts and lowers the disc cutter in the vertical direction, and a transverse displacement unit, which moves the disc cutter forwards and backwards in the left-right direction, is present. During the cutting into the cladding of the electrical line, the disc cutter is displaced by the lifting unit and the transverse displacement unit in such a way that it revolves around the circumference of the electrical line, wherein a cut is created on the cladding by displacing a contact point of the disc cutter.

It has also already been suggested several times that the insulation of films can be stripped by means of lasers, as disclosed for example in KR 101610306 B1.

In whatever way the section of the sheath, which is to be removed, is cut, perforated or is otherwise separated from the remaining section, the section to be removed must be separated from the cable. Pulling off these parts requires a relatively high use of force, wherein it is difficult to transfer the force to the sheath. The sheath sections cannot be pulled off by only using friction, because the friction between the pull-off and the sheath is approximately identical to the friction between sheath and the electrical conductors located therebelow or other cable elements.

It was thus the object of the present invention to further develop a device or a method, respectively, as specified above, in such a way that all separated sections of a sheath can be removed from the cable in an automated manner and safely as well as as completely as possible.

To solve this object, the above-described device is characterized in that a pull-off device for the at least partially cut sheath is integrated into the device and that this pull-off device comprises pull-off means, which are designed for the non-positive (frictional) connection to the sheath and for the exertion of a force on the sheath parallel to the cable axis. Due to the non-positive (frictional) connection between pull-off means and cut section of the sheath, further forces can be avoided, which make a pull-off more difficult or which would counteract it.

Provision is thereby preferably made for the pull-off device to comprise at least one application arrangement for at least one adhesive tape each, at least one adhesive tape as pull-off means, as well as means for pulling off the at least one adhesive tape with adhesive sheath in the longitudinal direction of the cable. The pulling off of the cut films requires a relatively large amount of force. This force, however, can be transferred well directly to the film via an adhesive tape. It makes it possible to also pull tightly-fitting sheaths of the parts located therebelow, such as, for example, strands, off the cable. After initially pressing the adhesive tape against the cut sections of the sheath, no further frictional force needs to be maintained, which would hinder the pull-off. The adhesive force, in contrast, is used to pull off the sheath. A further advantage for the use of adhesive tape is that the pulled-off parts of the sheath remain fixed on the adhesive tape, which is rolled up continuously. Sheath parts thus do not need to be absorbed or removed in another way by separate devices.

A further advantageous embodiment of the invention is characterized in that the application arrangement comprises at least one guide jaw for the adhesive tape, which can automatically be moved radially towards the cable and away from the cable with respect to the cable and which can be moved in the longitudinal direction of the cable. The secured and precise supply of the adhesive tape or of corresponding pull-of means, respectively, can be effected via such a guide jaw in a simple manner.

According to the invention, an optional embodiment of the device is thereby characterized in that this guide jaw is a rigid body and is provided with an elastic layer on its section, which comes to rest on the cable. The guide jaw is preferably made of metal, which ensures a long service life and optimal transfer of the pressing forces of the adhesive tape. The elastic insert, in contrast, ensures a good positive connection with the cable in the contact area of the guide jaw, in order to press on the adhesive tape across as large an area as possible and in order to thereby encompass the cable in a gentle manner.

According to a further optional feature of the invention, the front side of the guide jaw consists of a material comprising a low friction coefficient, so as to facilitate the supplying of the adhesive tape or of a similar pull-off means. For this purpose, the material of the guide jaw is preferably pulled forwards to the front side of the guide jaw in a structurally simple manner. So as not to interfere with the adaptation of the guide jaw to the cable circumference thereby, a small cutout can be fashioned on the front side in the area of the cable, if applicable in the material of the guide jaw pulled forwards.

An advantageous embodiment of the invention provides for the means for pulling off the adhesive tape comprising adhesive sheath in the longitudinal direction of the cable to be formed by means of the supply or storage device for the adhesive tape, which can be locked at least temporarily or which is released permanently only in the supply direction, as well as by means of a carriage, which can be moved along the cable and to which the supply or storage device is attached. This makes it possible to accomplish the pull-off of the pull-off means comprising the sheath fixed thereon in a simple and also in an easily automatable manner by means of a movement of the supply or storage device for the adhesive tape along the cable axis.

A device according to the invention is preferably characterized in that the application arrangement for the pull-off means has two arrangements comprising guide jaw and supply or storage device for the adhesive tape, preferably in the form of adhesive tape rolls, on opposite sides of the cable, which application arrangements is assembled on a carriage, which can be moved forwards and backwards along the longitudinal cable axis, for a relative movement with respect to the cable in the longitudinal cable direction. The pull-off of the cut sheath requires a relatively large amount of force, which is difficult to transfer to the cut-off or separated sections of the sheath. By using two adhesive tapes on opposite sides of the cable, the cable is surrounded completely and all sheath sections are surrounded completely and the force for the pull-off is transferred to as large an area as possible.

An advantageous embodiment according to the invention furthermore provides the option that the application arrangement has a sensor for markings on the adhesive tape, which is connected to an evaluation unit for the sensor signals. By means of such a monitoring with different encoding, depending on the type, it can be verified whether the correct adhesive tape type is used. A verification of the correct tape transport is thus also possible, as well as the identification of the tape end.

A preferred further development of the device according to the invention according to one of the preceding paragraphs is characterized in that a sheath scraping arrangement is additionally integrated into the device. If remainders of the sheath thus remained on the cable after pulling off the sheath, these remainders can be pushed back in the direction away from the exposed cable end. For a simple feeding of the cable and the simple adherence to the machining sequence according to the process, it is advantageous, when the sheath scraping arrangement is preferably positioned in the cable feed direction upstream of the blade arrangement and when the pull-off device is preferably positioned in the cable feed direction downstream from the blade arrangement. Even though the scraping arrangement is described in connection with the blade arrangement according to the invention herein, it is obvious that the scraping arrangement can on principle be combined with any cutting arrangement or separating arrangement for the sheath, which is to be removed. For instance, a push-back of remainders of the sheath, which remained, may also be advantageous in the case of cutting arrangements on the basis of cutting lasers, as well as in the case of separating arrangements comprising a perforation of the sheath and subsequent tear-off and pull-off of the end piece of the sheath.

An advantageous embodiment of this device has a scraping arrangement comprising a scraper head comprising at least two, preferably four, shaping jaws, which can be closed centrally around the inner conductors of the cable. In closed, that is in maximally approximated position, these shaping jaws together form a preferably round through opening for the arrangement of the inner conductors of the cable, wherein said through opening can be adjusted to the radius of the enveloping circle thereof. Remaining remainders of the sheath can be pushed back easily and as completely as possible by means of such a scraper head comprising shaping jaws, which cooperate similarly to a diaphragm.

According to a further optional feature of the invention, each shaping jaw consists of a support body and of a scraper, which is fastened thereto, wherein each support body has at least one seal, which is directed towards at least one adjacent shaping jaw, in such a way that an at least almost air-tight chamber, which is connected to at least one compressed air supply, is formed around the cable between scrapers, support bodies, and seals. The term scraper thereby includes every element comprising a sharp edge, which can have a scraping effect parallel to the cable, but without damaging the cable. Remainders of the sheath, which still remained on the inner conductors, strands or other parts of the cable, can thus be lifted off the support by means of one or a plurality of bursts of compressed air and can subsequently be pushed back on the shaping jaws by means of the scrapers.

To solve the object raised above, provision is also made for a method for removing an inner sheath of electrical conductors of a multicore cable, preferably of a film located between a shielding or an insulation and the inner conductors. Such a method fundamentally includes the clamping of the cable and the cutting of the inner sheath.

According to the invention, such a method is characterized in that a non-positive (frictional) connection to a pull-off means is established and that the cut or cut-off sheath is subsequently pulled off in the longitudinal direction of the cable.

At least one adhesive tape is thereby preferably pressed onto the cut or cut-off sheath and is subsequently pulled off in the longitudinal direction of the cable, together with the cut or cut-off sheath.

A further advantageous variation of the method according to the invention provides for two adhesive tapes to be applied from opposite sides with regard to the cable axis, wherein the adhesive tapes are preferably kept ready in a funnel-shaped manner prior to being pressed on and are only subsequently pressed on by means of guide jaws so as to abut on the sheath. The guide jaws are preferably lifted off the cable again immediately prior to and during the pull-off of the adhesive tape, so as to avoid the friction between the sheath, which is to be pulled off, and the remainder of the cable by means of this at least partial opening, by means of which a significant reduction of the force, which is required for the pull-off, can be attained as well.

Advantageously, the method can optionally be designed in such a way that a monitoring of the type of the adhesive tape and/or of the correct unwinding thereof and/or of the reaching of the end of the adhesive tape takes place.

In the case of the method according to the invention, it is preferably further ensured that the cable end is pushed through a sheath scraping arrangement and then through the blade arrangement, and that the cable is pulled back into the sheath scraping arrangement after the cutting and after pulling off the inner sheath, and that it is pushed forwards again after the activation of said sheath scraping arrangement.

In order to be able to push back the remainders of the sheath, which still remained on the cable, as completely as possible, they can be lifted off the cable slightly, when a method variation is provided, according to which, prior to or while pushing the cable forward into a scraper head, an overpressure is built up in this scraper head in the sheath scraping arrangement and at least one burst of compressed air is thus directed towards the cable end.

Further advantages, features and details of the invention follow from the description below, in which exemplary embodiments of the invention are described by referring to the drawings. The features mentioned in the claims and in the description can thereby in each case be significant for the invention, either alone or in any combination.

The list of reference numerals is part of the disclosure. The figures are described cohesively and comprehensively. The same reference numerals mean the same components, reference numerals with different indices specify components, which have the same function or which are similar.

Figure 3:
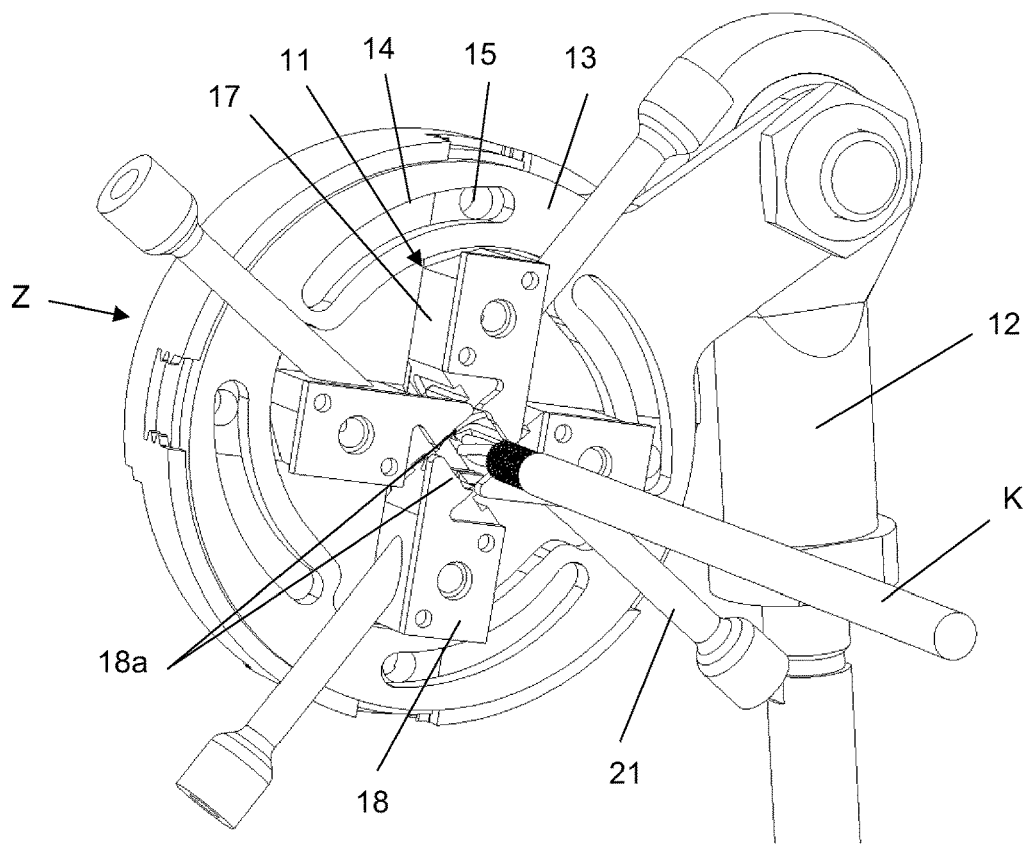
Figure 4:
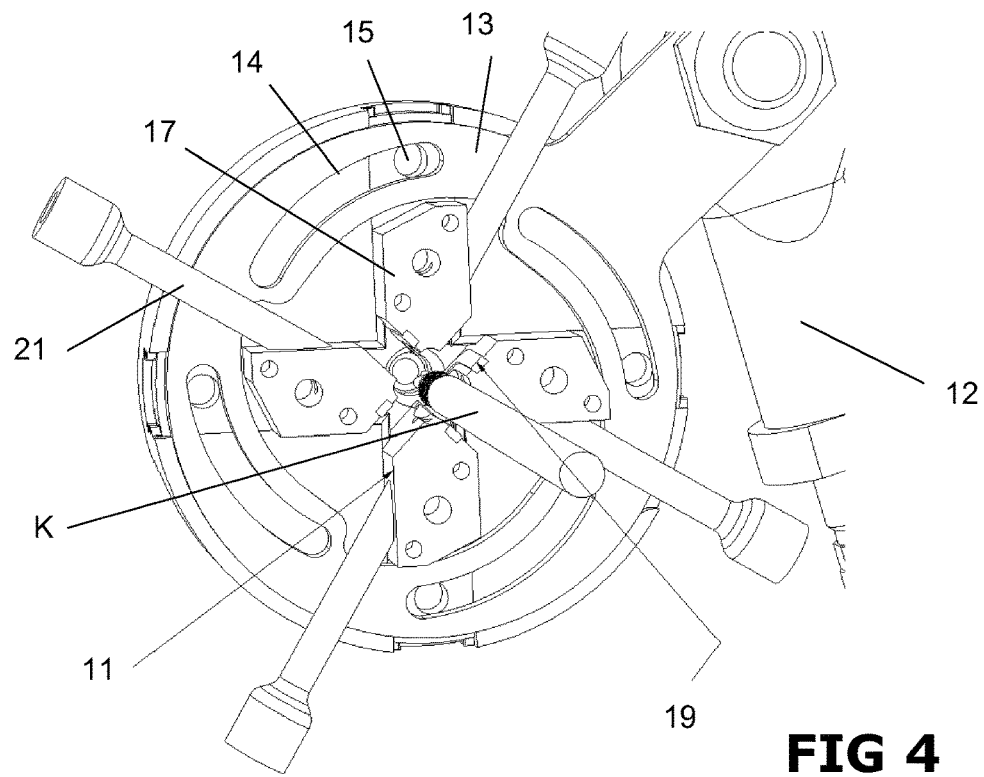
Figure 5:
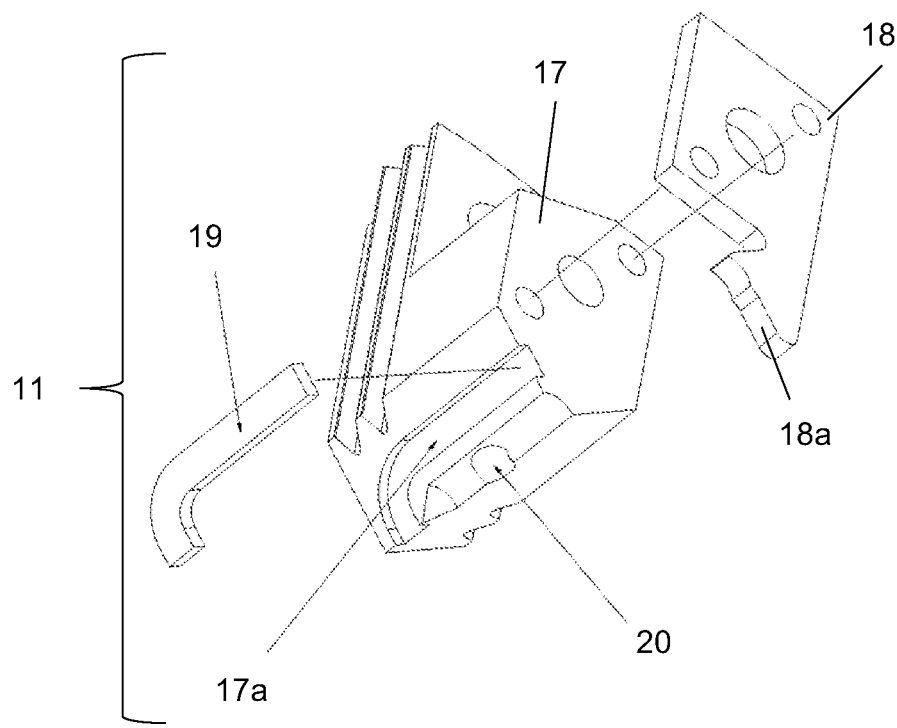
Figure 6A:
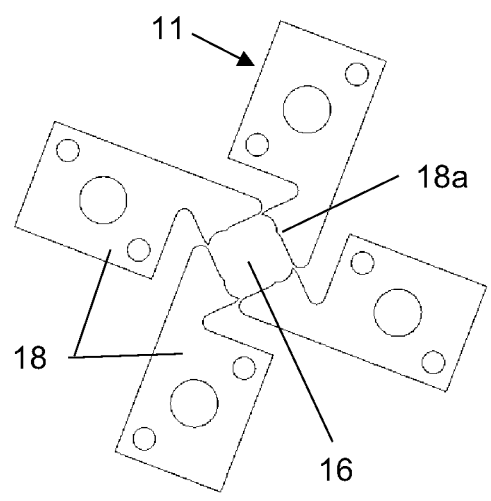
Figure 6B:
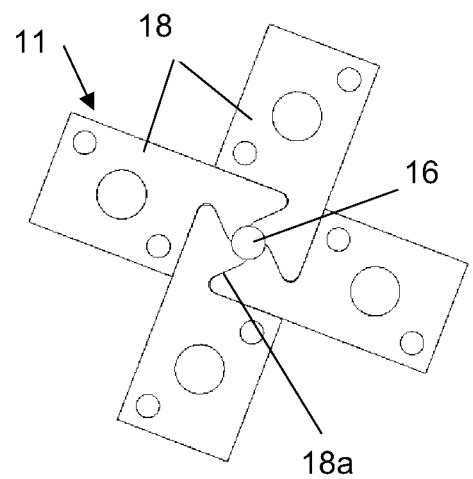

FIG. 3 shows an embodiment of the scraper head of a sheath scraping arrangement with open shaping jaws, FIG. 4 shows the scraper head of FIG. 3 with open shaping jaws, from which the scrapers are removed, FIG. 5 shows an individual shaping jaw comprising seal and scraper in exploded illustration, FIG. 6a shows a schematic illustration of the scraping arrangement in completely open position, and FIG. 6b shows the scraping arrangement of FIG. 6a in completely closed position.

Figure 1:
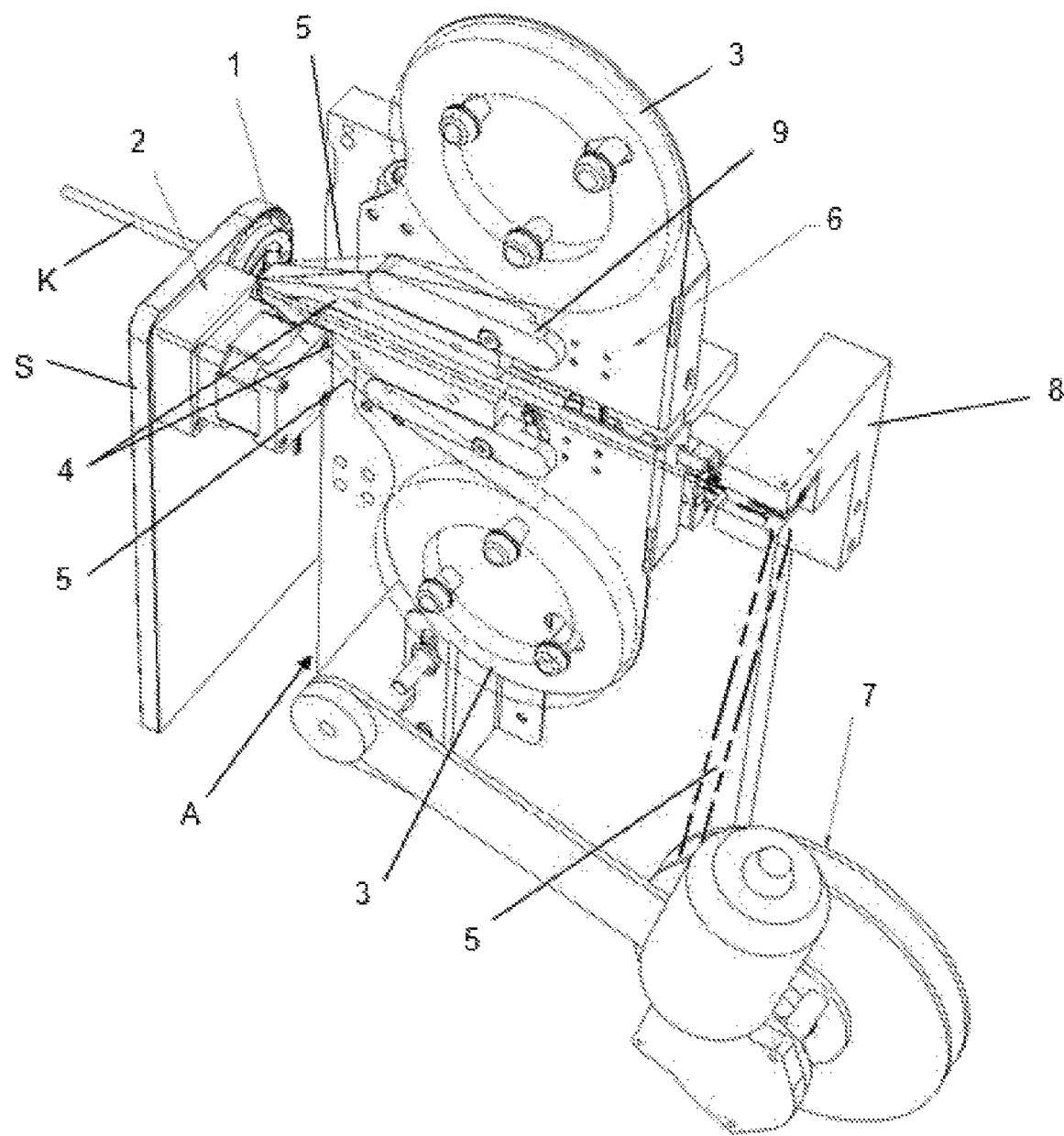
FIG. 1 shows a device according to the invention in perspective illustration.

A device according to the invention is illustrated in FIG. 1 in its entirety. In the illustration version, it comprises the components cutting device S comprising at least one holding arrangement or clamping device, respectively, for the axial and rotative clamping of the cable K (not illustrated), a blade wheel 1 and the drive 2 thereof, and a pull-off device A, which is preferably positioned downstream from the cutting device S in the cable feed direction, for the cut sections of a sheath of internal elements of the cable K. A sheath scraping arrangement (not illustrated in FIG. 1) could further also be integrated into the device, wherein the advantageous positioning thereof is provided in the cable feed direction upstream of the cutting device S, in particular upstream of the blade wheel 1, possibly also laterally thereof in the immediate vicinity, so as to ensure paths, which are as short as possible, for the movement of the cable end, which is to be machined. An arrangement, in the case of which the cable K is first pushed through a completely open sheath scraping arrangement and then into a cutting device S, which is located directly behind it, is particularly advantageous. After cutting the sheath and pulling it off, the cable K then needs to only be pulled back through the cutting device S to the scraping arrangement so as to push back the remainders of the sheath, which remained.

The pull-off device A has two adhesive tape rolls 3, as well as two guide jaws 4 for the adhesive tapes 5, which are arranged jointly on a carriage 6, which can be displaced parallel to the longitudinal direction of the cable K. The carriage 6 further also supports a retractor 7 for the adhesive tape 5 comprising the pulled-off sections of the sheath, which are fixed thereon.

Driven by the drive 2, the blade wheel 1 of the cutting device S rotates around the cable K, which is centrally guided through, and cuts the sheath at least across parts of the circumference thereof and at least across a part of the thickness thereof in the course of the rotational movement by means of at least one cutting edge fastened thereto.

The cut sections of the film are removed by means of the pull-off device A. Two adhesive tapes 5, which are located opposite one another with regard to the cable K and which face one another with the adhesive surfaces and which reach from the adhesive tape rolls 3 and the guide and pressing jaws 4 to the cable K. At the beginning of the pull-off process, the two guide jaws 4 are moved apart from one another at least on their front ends. The two adhesive tapes 5 thus form a funnel, which is pushed over the cable end or the sections of the sheath, which still adhere thereto, respectively. The guide jaws 4 are moved radially towards the cable K in an automatically controlled manner, preferably pivoted, either during or after the cutting of the sheath, whereby the adhesive tapes 5 are pressed on. The guide jaws 4 are thereby preferably embodied as rigid bodies, but are provided with an elastic layer on their front section, which comes to rest against the cable. A production using metal comprising an elastic insert in the areas, which come into contact with the cable, is a preferred embodiment. The front side of the guide jaw 4 will thereby typically also be made of a material comprising a low friction coefficient, for example the material of the guide jaw 4, which is pulled forwards onto the front side of the guide jaw 4. A small section in that area, which comes closest to the cable K, can be fashioned on the front side of the guide jaw 4.

Figure 2:
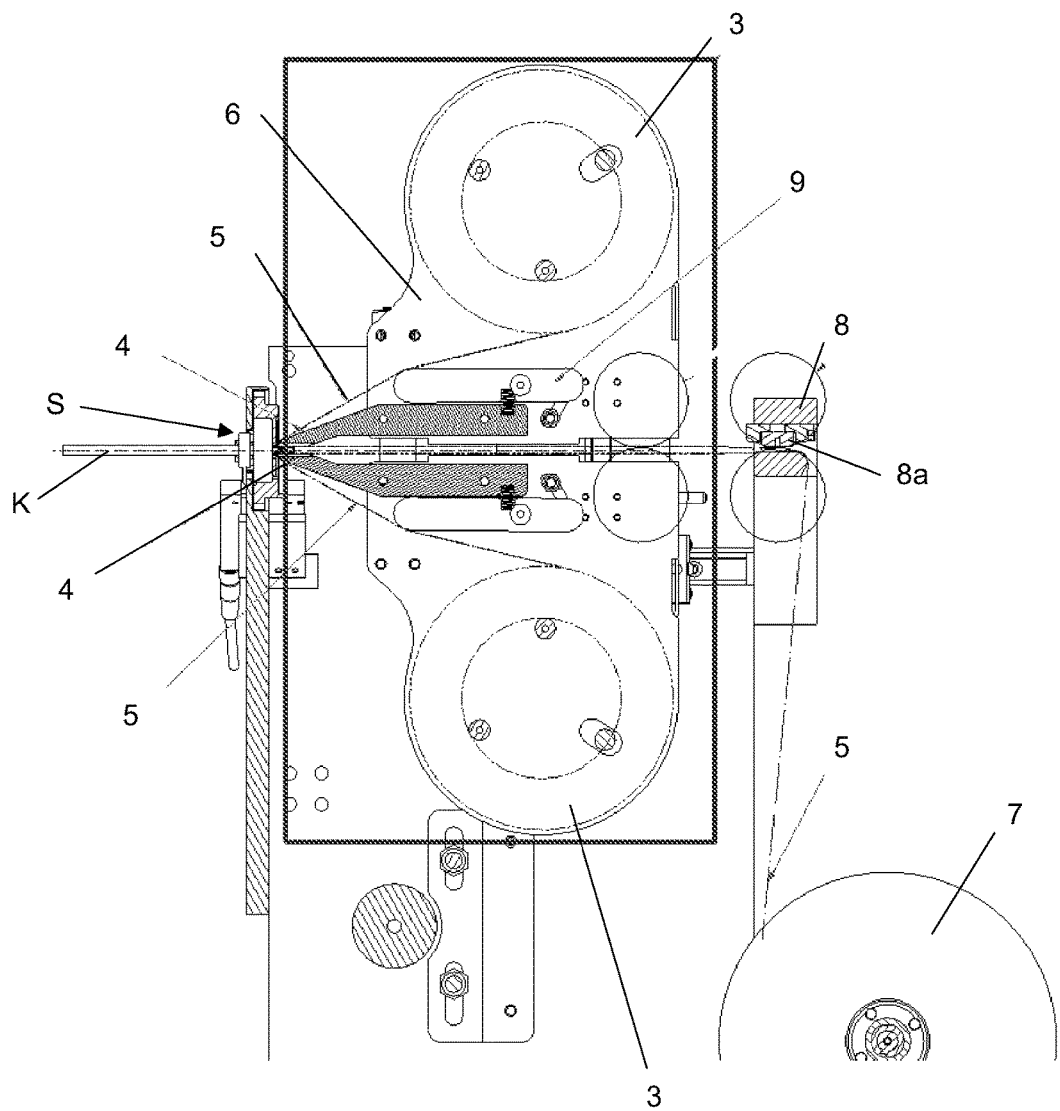
FIG. 2 shows the device of FIG. 1 in side view.

After pressing the adhesive tapes 5 against the sheath, which is cut off or cut, on the cable K, by means of the areas of the guide jaws 4, which are preferably rubber-coated, the adhesive tape 5, together with the sections of the sheath adhering thereto, is pulled back in the longitudinal direction of the cable K. For this purpose, the unrolling of the adhesive tape 5 from the adhesive tape rolls 3 is prevented, the adhesive tape rolls 3 are locked, for example, and the carriage 6, together with the adhesive tape rolls 3, the guide jaws 4 and the adhesive tape 5, is pulled away from the cable K and the cut sections of the sheath are thereby pulled off from the elements of the cable K located therebelow, wherein these sections remain between the two adhesive tapes 5. The adhesive tape 5 comprising the sheath sections is thereby guided to the retractor 7 across a clamping and deflecting unit 8 and is rolled up at that location for subsequent disposal. As can be seen in FIG. 2, control arms 9 can be arranged at every guide jaw 4 and every adhesive tape 5, in order to monitor the movements thereof or the unrolling, respectively.

In the rear position of the carriage 6, the adhesive tape 5 is clamped in the clamping and deflecting unit 8, for example by means of a pneumatic cylinder 8a, the adhesive tape rolls 3, which move forwards again and which are released again, are unwound by the stroke length, the guide jaws 4 open again. The sequence for the pull-off can thus start from the beginning again.

In an alternative embodiment, the adhesive tape 5 is not clamped with a pneumatic cylinder 8a, but is guided between four rolls 3 with free wheel. Two rolls 3 move along on the carriage 6, two other rolls are fixedly mounted. The free wheel only allows for a rotation of the rolls in one direction. By moving the carriage 6 forwards and backwards, the adhesive tapes 5 are advanced.

Different types of adhesive tapes 5 can thereby also be used for different cable types. It is also important to monitor the correct unrolling of the adhesive tapes or the sufficient pull-off path for pulling-off the cut sheath, respectively. For this purpose, adhesive tapes comprising markings, such as, for instance, bar codes, are advantageously used on the non-adhesive rear side. These markings can be detected via a corresponding sensor of the application arrangement, for example a contrast sensor in the case of bar codes, and can be processed in an evaluation unit. Depending on the pull-off length, a corresponding number of bars must be detected by the controller. Different adhesive tape types can have different bar patterns (principle of bar code) imprinted for differentiating purposes. The sensor monitoring of the adhesive tape, which could also take place via cameras, for example, also makes it possible to detect, when the tape end is reached and when a new adhesive tape roll 3 needs to be inserted.

In spite of optimal embodiment of the cutting device 5 and of the pull-off device A, a complete removal of the sheath is not possible for some cable types, so that a small triangle of the film does remain between two adjacent strands of the cable. This can then be pushed back by means of a further device, a sheath scraping arrangement in a further operating step. This scraping arrangement, which is preferably arranged immediately upstream of the cutting device S in the cable feed direction, includes a scraper head Z, which closes centrally around the cable and which is emphasized in FIGS. 3 and 4. The cable K is guided through scraping arrangement as well as the cutting device S, preferably pushed through. After cutting the sheath and after the pull-off process, the cable K is pulled back all the way behind the scraping arrangement in the longitudinal direction, the scraper head Z is activated and the remaining remainders of the sheath are scraped back by means of an axial movement of the cable K in the longitudinal direction to the scraper head Z, which preferably remains stationary—and also towards the cutting devices. It goes without saying that embodiments comprising a scraper head Z, which can be displaced along the cable K, are possible as well.

This scraper head Z is provided with at least two, in the illustrated embodiment with four, shaping jaws 11, which can be moved radially towards the cable K and away from it via an actuating mechanism 12, 13, 14, 15. For this purpose, a pin 15 of the shaping jaw 11 engages with a helical groove 14, which extends across a part of the circumference of a rotatable ring 13. The ring 13 can be rotated about an axis, which coincides with the axis of the cable K, via a pressure or connecting rod 12, respectively, for example the piston rod of a controllable fluid cylinder (not illustrated). In the innermost end position of the shaping jaws 11, the latter enclose the cable K in a substantially tight manner by forming a preferably substantially round through opening 16 (see FIG. 6b). The width of the through opening 16 can be adjusted accordingly to the radius of the envelope circle of the inner elements of the cable K, which are located under the sheath, via the working stroke of the pressure or connecting rod 12, respectively.

Advantageously, each shaping jaw 11 consist of a support body 17 and of a scraper 18 fastened thereto or of a comparable component, which has a sharp edge 18a for exerting a scraping effect parallel to the cable K, but without damaging the cable K. Every support body 17 is furthermore provided with at least one seal 19, which is directed towards at least one adjacent shaping jaw 11 and which are inserted into the corresponding groove-like accommodations 19a.

In the case of shaping jaws 11, which are completely pushed together towards the cable K, an almost air-tight chamber, which surrounds the cable K, can thus be formed, limited by the scrapers 18, the support bodies 17, the seals 19 and the centrally accommodated cable K. Each shaping jaw 11 thereby preferably seals against the closest shaping jaw 11. A blowing opening 20, through which compressed air can be supplied via a compressed air supply line 21, leads into the chamber in every support body 17. Remainders of the sheath abutting on the cable K are lifted by means of at least one burst of compressed air when the shaping jaws 11 are closed, in particular in the valleys between individual strands or conductors of a cable, and can subsequently be seized and pushed back easily and completely by the tightly-fitting scrapers 18. All cable types can thus be machined in a satisfactory manner. The radial position of the shaping jaws 11 and/or the position of the scrapers 18 on the support bodies 17 can advantageously be adjusted within a certain range, for example by means of an adjusting screw.

LIST OF REFERENCE NUMERALS 1 blade wheel
2 drive
3 adhesive tape roll
4 guide and pressing jaw
5 adhesive tape
6 carriage
7 retractor
8 deflecting and clamping mechanism
8a pneumatic cylinder
9 control arm
11 shaping jaw
12 pressure/connecting rod
13 ring
14 helical groove
15 pin
16 central opening
17 support body
17a accommodation for seal
18 scraper
18a edge
19 seal
20 blowing opening
21 compressed air line
S cutting device
A pull-off device for sheath
Z scraper head

The invention claimed is:

1. A method of removing an inner sheath of electrical conductors of a multicore cable (K) having a film located between a shielding or an insulation and the inner conductors, the method comprising:
   clamping of the cable (K),
   cutting of the inner sheath,
   establishing a frictional connection with a pull-off means by pressing at least one adhesive tape (5) onto a cut or a cut-off sheath, and
   subsequently pulling off, in a longitudinal direction of the cable (K), the cut or the cut-off sheath via the at least one adhesive tape (5).

2. The method according to claim 1, further comprising applying two adhesive tapes (5) from opposite sides with respect to a cable axis, keeping the two adhesive tapes (5) ready in a funnel-shaped manner prior to being pressed on and are only subsequently pressed on by guide jaws (4) so as to abut against the sheath and are again lifted off the cable (K) during the pull-off.

3. The method according to claim 1, further comprising monitoring at least one of:
   a type of the at least one adhesive tape (5),
   a correct unwinding of the at least one adhesive tape (5), and
   reaching of an end of the at least one adhesive tape (5).

4. The method according to claim 1, further comprising pushing the cable end through a sheath scraping arrangement (Z) and then through the blade arrangement (1), and pulling the cable (K) back into the sheath scraping arrangement (Z) after the cutting and after pulling off the inner sheath, and again pushing forward after activation of the sheath scraping arrangement.

5. The method according to claim 4, further comprising, prior to or while pushing the cable (K) forward into a scraper head (Z), building up an overpressure in the scraper head (Z), in the sheath scraping arrangement, and directing at least one burst of compressed air toward the cable end.

* * * * *